United States Patent Office 2,740,766
Patented Apr. 3, 1956

2,740,766

ACRYLONITRILE POLYMERS STABILIZED WITH CERTAIN ALKYL SULFONES

George W. Stanton and Forrest A. Ehlers, Walnut Creek, Calif., assignors to The Dow Chemical Company, Midland, Mich., a corporation of Delaware No Drawing. Application September 4, 1952, Serial No. 307,919

6 Claims. (Cl. 260—45.7)

This invention relates to compositions of matter consisting essentially of a polymer containing at least 60 per cent of acrylonitrile in the polymer molecule, and a stabilizing agent to protect the polymer from the embrittling or discoloring effects of exposure to light or heat.

Polyacrylonitrile and copolymers containing acrylonitrile as the predominant constituent undergo undesirable physical changes upon prolonged exposure to light or to heat. The observable symptoms of such changes are embrittlement or discoloration, or both, due, in varying measure to the action of either light or heat. Since the uses to which such polymers are put include the manufacture of molded articles and thin films, either embrittlement or discoloration is to be avoided, if possible. To this end, it would be desirable to provide agents which can be admixed with the polymers to protect them against one or more of the adverse effects of the conditions to which they may be exposed. The provision of stabilized compositions of the polymers and such protective agents is the principal object of the present invention.

This object is realized, according to the invention, by mixing with the polymer from 1 to 20 per cent, and preferably from 5 to 15 per cent by weight of an alkyl sulfone having the formula

wherein one R represents a linear alkyl group having from 1 to 4 carbon atoms and the other R represents a linear alkyl group having from 3 to 4 carbon atoms, the total number of carbons in both alkyl groups being from 5 to 8, inclusive. Articles made from the resulting compositions show little or no tendency to discolor upon prolonged exposure to ultraviolet light, and exhibit little of the tendency to become brittle as a result of such exposure, especially when the stabilizer is present at concentrations of 5 per cent or more.

A copolymer of 80 per cent acrylonitrile and 20 per cent isobutylene was prepared in aqueous emulsion, the polymeric particles were coagulated by addition of magnesium chloride solution, and the coagulum was washed and dried. This copolymer was found to be soluble to the extent of over 15 per cent by weight in acetone. In evaluating the various stabilizers, a 15 per cent solution of the copolymer in acetone was prepared, an amount of stabilizer equal to 15 per cent of the weight of copolymer was dissolved in the solution, and films were cast from the solution on glass plates. The films were dried in air overnight, then at 70° C. for one hour. The resulting films were mounted near the rim of a horizontal turntable, with half of the film covered and the other half exposed. The turntable was set in motion in a Fadeometer, and the exposed films were irradiated for 120 hours. The several films were then tested with a photoelectric reflection meter which had been set to read 100 when turned toward a glazed white tile (see footnote). An exposed but untreated film of the copolymer gave readings of about 70 and had a light tan color, while the covered and unexposed portions of all the films gave readings of 90 to 96, using the white tile standard as a background.

NOTE.—In the Fadeometer employed, two type S–4 General Electric Sunlight lamps are disposed horizontally and parallel to one another, with the centers of the bulbs 4 inches apart, at a height 5.75 inches above, and displaced 6 inches from the center of a 12-inch turntable driven at 33⅓ revolutions per minute. The reflection meter used is a Model 610, made by the Photovolt Corporation, 95 Madison Ave., New York city, having a tristimulus blue filter and set to read 100 when turned toward a color-standard white ceramic "Vitrolite" tile supplied by Gardner Laboratories, Bethesda, Maryland.

Results with typical compounds in the recited class are given below:

| Test Compound | Reflection meter reading after 120 hrs. in Fadeometer |
| --- | --- |
| (Stabilizers): | |
| None | about 70. |
| Ethyl n-propyl sulfone | over 89. |
| Di-n-propyl sulfone | over 89. |
| n-Propyl n-butyl sulfone | over 89. |
| Di-n-butyl sulfone | over 89. |
| Ethyl n-butyl sulfone | over 89. |
| Methyl n-butyl sulfone | over 89. |
| For contrast (non-stabilizer): | |
| Diphenyl sulfone | under 71. |

The alkyl sulfones having 2 or 3 total carbon atoms, while compatible with the polymers, are too volatile for the present use and are generally less effective than those of the present invention.

To determine the effective concentration of stabilizer in the acrylonitrile copolymer of the above examples, a series of films was made with varying amounts of the sulfones, and the films were exposed as before for 120 hours in the Fadeometer.

| Percent by weight of sulfone | Reflection meter Reading |
| --- | --- |
| none | about 70. |
| 0.5 | about 75. |
| 1.0 | about 80. |
| 3.0 | about 85. |
| 5.0 | about 89. |
| 10.0 | about 89. |
| 15.0 | about 89. |

The samples containing 5 per cent or more of the stabilizer were non-brittle, or much less brittle than those containing smaller amounts of stabilizer. The same stabilizer was added in amounts from 5 to 15 per cent by weight to various polymeric bodies in which acrylonitrile was the predominant polymerized constituent, and the products were exposed in a Fadeometer and tested with the reflection meter, with the following results. The products tested were fibers, films or flow moldings.

| Polymer Composition | Hours Exposed | Meter Reading |
| --- | --- | --- |
| Polyacrylonitrile (fiber) | 454 | about 90. |
| Acrylonitrile—60%; Methyl acrylate—40% | 166 | over 90. |
| Acrylonitrile—86%; Isobutylene—10%; Allyl alcohol—4% | 139 | about 89. |
| Acrylonitrile—62.5%; Vinyl acetate—37.5% | 813 | about 89. |

We claim:
1. A composition of matter the essential constituents of which are a polymeric body containing at least 60 per cent by weight of acrylonitrile polymerized in the polymer molecule, any balance being another monoethylenically unsaturated compound copolymerized with acrylonitrile, and, as a stabilizing agent therefor, from 1 to 20 per cent of an alkyl sulfone in which the alkyl groups are linear, do not individually contain over 4 carbon atoms, and the sum of the carbon atoms in both alkyl groups is from 5 to 8, inclusive.

2. The composition claimed in claim 1, wherein the stabilizing agent is di-n-propyl sulfone.

3. The compostion claimed in claim 1, wherein the stabilizing agent is di-n-butyl sulfone.

4. The composition claimed in claim 1, wherein the stabilizing agent is ethyl-n-propyl sulfone.

5. The composition claimed in claim 1, wherein the stabilizing agent is methyl-n-butyl sulfone.

6. The composition claimed in claim 1, wherein the stabilizing agent is present in amount of 5 to 15 per cent of the weight of the polymer.

References Cited in the file of this patent

UNITED STATES PATENTS 2,404,717    Houtz  ---------------- July 23, 1946